United States Patent [19]

Sasaki et al.

[11] Patent Number: 4,758,719
[45] Date of Patent: Jul. 19, 1988

[54] OPTICAL FIBER CONNECTOR HAVING SPACING GAP FOR DIMENSIONAL TOLERANCE

[75] Inventors: Hiroaki Sasaki; Yoshinori Miyahara, both of Furukawa, Japan

[73] Assignee: Alps Electric Co., Ltd., Japan

[21] Appl. No.: 843,710

[22] Filed: Mar. 24, 1986

[30] Foreign Application Priority Data

Mar. 23, 1985 [JP] Japan ............................. 60-41649[U]

[51] Int. Cl.⁴ ............................. H01J 5/16; G02B 6/36
[52] U.S. Cl. ..................................... 250/227; 350/96.2
[58] Field of Search ................. 350/96.2, 96.21, 96.22; 250/227

[56] References Cited

U.S. PATENT DOCUMENTS

| | | | |
|---|---|---|---|
| 4,410,469 | 10/1983 | Katagiri et al. | 350/96.2 |
| 4,458,983 | 7/1984 | Roberts | 350/96.2 |
| 4,461,537 | 7/1984 | Raymer, II et al. | 350/96.2 |
| 4,531,810 | 7/1985 | Carlsen | 350/96.2 |
| 4,539,476 | 9/1985 | Donuma et al. | 350/96.2 |
| 4,615,581 | 10/1986 | Morimoto | 350/96.2 |

Primary Examiner—David C. Nelms
Assistant Examiner—Michael Messinger
Attorney, Agent, or Firm—Guy W. Shoup; Leighton K. Chong

[57] ABSTRACT

The gap between end surfaces of optical converters provided at the ends of optical guide paths of optical fibers is maintained constant with a high accuracy and thereby optical coupling efficiency of such optical converters is stabilized with the structure of an optical fiber connector that both optical guide ends of optical guide path ends collide with each other, a recessed part is formed at least to the one surface of the optical guide ends and a constant gap is formed between the end surfaces of optical converters provided at the optical guide path ends.

3 Claims, 6 Drawing Sheets

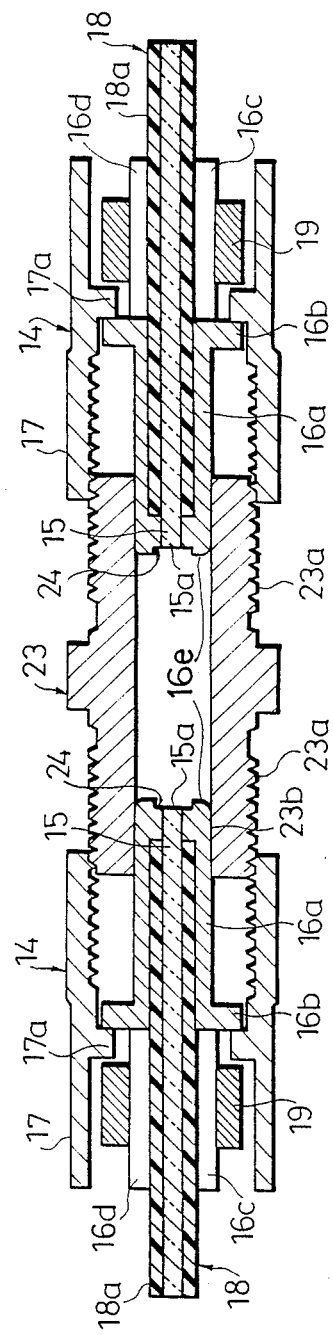
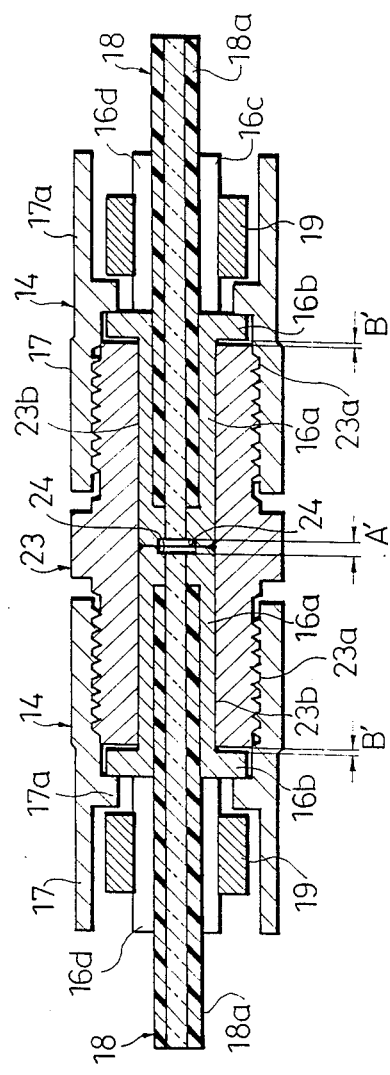

OPTICAL FIBER CONNECTOR HAVING SPACING GAP FOR DIMENSIONAL TOLERANCE

This application is related to copending application Ser. No. 849,746, filed on Apr. 9, 1986.

BACKGROUND OF THE INVENTION

1. Field of the Invention

The present invention relates to a optical fiber connector for removably coupling an optical converter at the end surface of optical guide path provided for optical coupling between an optical fiber and an optical conversion element such as LED, phototransistor, photodiode, etc. and between optical fiber cables and more specifically to a connector which can stabilize the coupling efficiency by maintaining the coupling gap between materials to be coupled with a high accuracy.

2. Description of the Prior Art

An optical data transmission system utilizing optical fibers and optical convertion elements is now widely introduced into the field of communication systems and particularly the optical fibers are much expected for the future as a means of low loss and large capacity data transmission line.

An optical data transmission system is required to use connectors for coupling optical fiber and optical conversion element or end surfaces of optical guide paths of optical fibers.

For the coupling of them, a constant gap (for example, about 50 μm) must be prepared between end surfaces of optical converters provided at the end part of optical guide paths.

Here, a prior art for coupling the optical guide paths of an optical conversion element and an optical fiber is explained with respect to FIG. 12 and FIG. 13. A light receptacle 1 comprises an optical conversion element 2 such as a LED, phototransistor, photodiode, etc. and is also provided with a cylindrical part 1b having the external thread 1a. At the center of end surface of optical guide path of such optical conversion element 2 is provided with an optical converter 2a which is a light receptor and emitter (consisting of receptor and emitter).

Meanwhile, a plug to be coupled with a light receptacle 1 is composed of a holding member which holds an optical fiber 4 and a cap nut having an engaging part 6a at the internal circumference thereof. This holding member 5 continuously forms a front cylindrical part 5a, a collar part 5b and a rear cylindrical part 5c. The front cylindrical part 5a holds an optical fiber 4, and both end surfaces of front cylindrical part 5a and optical fiber 4 are ground to the same surface level. The rear cylindrical part 5c holds an optical fiber cable 7 covering an optical fiber 4 and the optical fiber cable 7 is fixed in such a fashion that a fixing device 8 is engaged with the rear cylindrical part 5c which is also formed with a slit 5d.

The plug 3 can be coupled with such light receptacle 1 in this way. Namely, the front cylindrical part 5a of holding member 5 is inserted into a cylindrical part 1b and the cap nut 6 is engaged and both end surfaces of collar part 5b engages with the cylindrical part 1b and the engaging part 6a of cap nut 6. In this timing, the receptacle and plug are coupled in the condition shown in FIG. 12, forming a gap A between the optical converter of optical fiber 4 and the optical converter of light receptacle.

However, according to the prior art, the gap A between the optical converter 2a of optical conversion element 2 and the end surface of optical guide path of optical fiber 4 is determined by the length D of the front cylindrical part 5a of holding member and positional relation between the position where the collar part 5b collides with the end surface of cylindrical part 1b of light receptacle 1 and the optical converter 2a of optical conversion element 2.

Therefore, the gap A includes fluctuation of the length B from the internal rear wall 1c of light receptacle 1 to the cylindrical part 1b, the length C from the rear surface of optical conversion element 2 to the optical converter 2a and the length D from the end surface of holding member 5 to the collar part 5b, and the gap A exceeds the desired allowance of size and can no longer maintain the constant size. After all, the end surfaces of optical guide paths of optical converter 2a and optical fiber 4 are finally in contact with each other or separated too much.

As described above, when the end surfaces of optical guide paths of optical converter 2a and optical fiber 4 are in contact with each other, flaws may be generated at the contact surface or dewing phenomenon is generated by water, remarkably making unstable the optical signal transmission characteristic. Moreover, if the gap A is too large, the conversion efficiency in the optical signal transmission characteristic of receptacle and plug is lowered and transmission intensity of optical signal is deteriorated.

SUMMARY OF THE INVENTION

With the background mentioned above with respect to the prior art, it is an object of the present invention to maintain the gap between end surfaces of optical converters provided at the ends of optical guide paths of optical fibers and thereby stabilize optical coupling efficiency of such optical converters.

In brief and in accordance with one aspect of the prevent invention, an optical fiber connector comprising an plug engaging member at the end of optical guide path and a plug which is removably engaged with said plug engaging member provides, in view of attaining such object, the structure that both optical guide end surfaces collide with each other, a recessed part is formed at least to the one surface of said optical guide ends and a constant gap is formed between the end surfaces of optical converters provided at said optical guide path ends.

In case of coupling optical conversion element and optical fiber or optical fibers, the optical guide path supporting end surfaces of optical fibers, etc. collide and a recessed part is formed at least to the one of the optical guide path end surface. Therefore, a constant gap can be provided between the end surfaces of optical converters provided at the optical guide path end surface.

In this case, fluctuation of such gap is only the allowance of size of opposing surface located at the recessed part and is not related to fluctuation of ther members. Thereby, a highly accurate gap can be maintained and the coupling efficiency of optical converters can be as much stabilized.

The novel features which are believed to be characteristic of the invention, both as to organization and method of operation, together with further objects and advantages thereof, will be understood from the following description considered in connection with the accompanying drawings in which several preferred embodiments of the invention are illustrated by way of example. It is to be understood, however, that the drawings are for the purpose of illustration and description only and are not intended as a definition of the limits of the invention.

BRIEF DESCRIPTION OF THE DRAWINGS

FIG. 1 to FIG. 11 are embodiments of an optical fiber connector to which the present invention is applied.

FIG. 1 is a sectional view illustrating the condition in which an optical fiber and an optical conversion element are to be coupled.

FIG. 2 is a sectional view illustrating the coupling condition of optical fiber and optical conversion element.

FIG. 3 is a perspective view illustrating the condition in which optical fiber and optical conversion element are separated.

FIG. 4 is a sectional view illustrating other embodiment of coupling codition of optical fiber and optical conversion element.

FIG. 5 is a perspective view illustrating separated condition of a plug.

FIG. 6 is a perspective view illustrating separated condition of a holding member.

FIG. 7 and FIG. 8 are sectional views illustrating connection examples of snap-in type.

FIG. 9 is a persepctive view illustrating separated condition of snap-in type connector.

FIG. 10 and FIG. 11 are sectional views illustrating examples of connector connecting optical fibers.

DESCRIPTION OF THE PREFERRED EMBODIMENTS

FIG. 1 to FIG. 11 illustrate embodiments of an optical fiber connector in which the present invention is applied.

Figure 1:
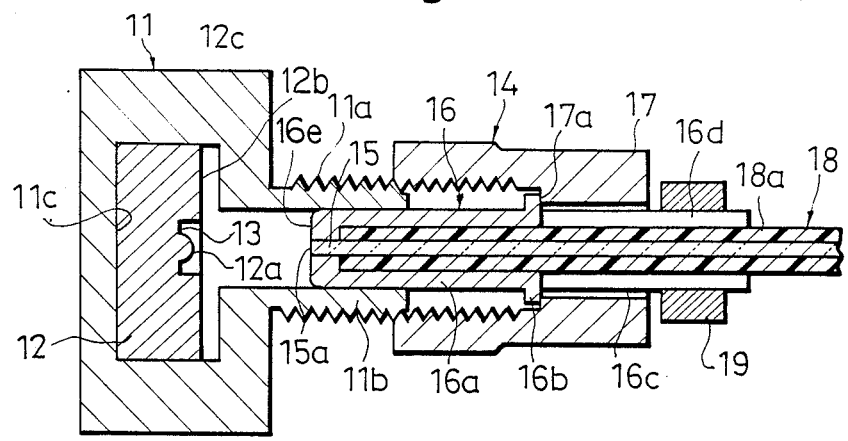

FIG. 1 to FIG. 9 represent respective examples of coupling an optical conversion element and an optical fiber. Turning first to FIG. 1, a light receptacle 11 (plug engaging member) comprises an optical conversion element 12, for example, such as an LED, phototransistor and photodiode, etc. A front part of the light receptacle 11 is provided with a cylindrical part 11a having external circumferential threads 11a as the engaged part which is threadably engaged with the inner threads of the cap nut 17 arranged at the plug 14 (to be described later). Moreover, an optical converter 12a which is a light receptor/light emitter (consisting of a light receptor and a light emitter) is provided at the center of the engaging surface 12b provided at the front side of optical conversion element 12, and an external lead 12d is provided to the optical conversion element 12.

In addition, a recessed part 13 is formed, to the optical converter 12a, at the circumference surrounding said optical converter 12a, the optical converter 12a is located within said recessed part 13, and the gap A' from such optical converter 12a to the front surface 12b is formed about 50 μm with high accuracy. The gap 12c is also provided between the front surface 12b of the optical conversion element 12 and the front inner wall of light receptacle 11.

Meanwhile, a plug 14 which is coupled with the light receptacle 11 is composed of a holding member 16 which holds an optical fiber 15 and a cap nut 17 which has the engaging part 17a at the internal circumference.

This holding member 16 is composed of a front cylindrical part 16a, a collar part 16b and a rear cylidrical part 16c. The front cylindrical part 16a holds an optical fiber 15, both end surfaces of the front cylindrical part 16a and optical fiber 15 are ground to the same level and an optical converter 15a is provided to the optical gide path end surface of optical fiber 15.

Figure 2:
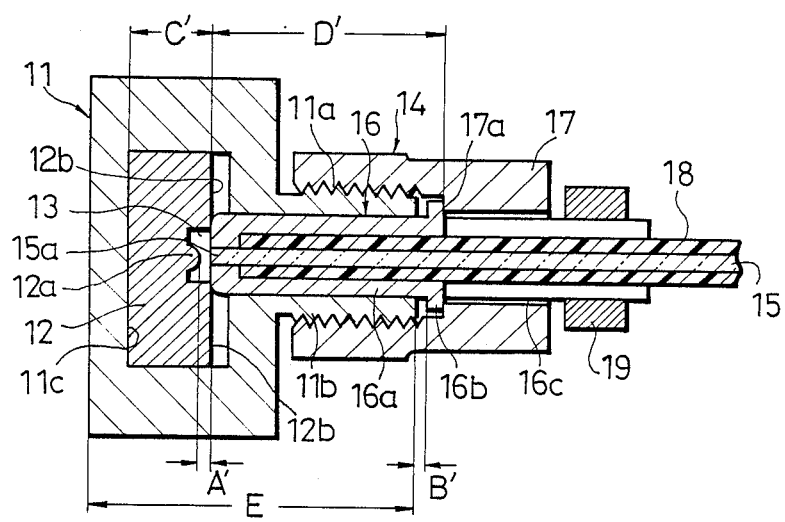
Figure 3:
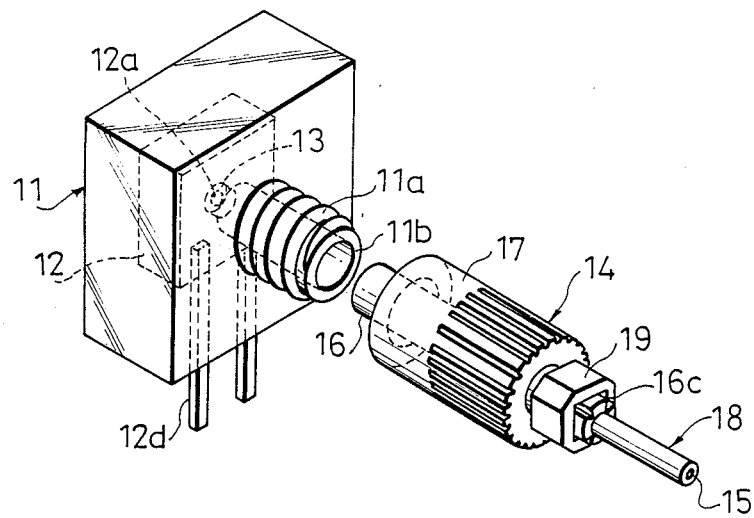

In FIG. 2, the end surface of holding member 16 collides with the front end surface 12b of optical conversion element 12 and a constant gap A' is held between the end surfaces of the optical converter 15a of the optical fiber 15 and the optical converter 12.

An optical fiber cable 18 having the covarage 18a at the external circumference of optical fiber 15 is held by the rear cylindrical part 16c and the optical fiber cable 18 is fixed by engaging a fixing device 19 withthe rear cylindrical part 16c forming a slit 16d.

The gap B' is formed between the end surface of cylindrical part 11b of light receptacle 11 and the end surface of collar part 16b when the light receptacle 11 and plug 14 are coupled.

The length of gap B' capable of absorbing all fluctuations in the respective lengths E from the rear internal wall 11c to the end surface of cylindrical part 11b of light receptacle 11, C' from each surface of optical conversion element 12 to fornt surface 12b of optical conversion element 12 and D' from the front end surface of holding member 16 to the engaging surface of collar part 16b when it is set larger than the fluctuation adding respective flucturations of said lenghts.

Operations of this embodiment mentioned above will then be explained hereunder.

When the front cylinder part 16a of the holding member 16 which is holding an optical fiber 15 is inserted into the cylindrical part 11b of the light receptacle 11 and the cap nut 17 is engaged by the thread with the external thread 11a of the light receptacle 11, the holding member 16 enters the interior of light receptacle 11 while the engaging part 17a of cap nut 17 is engaging with the collar part 16b and the end part of holding member 16 is inserted up to the position where it collides with the front end 12b of the optical conversion element 12.

Thereby, a predetermined gap A' is defined between the optical converter 15a of optical fiber 15 which is set in the same level as the end surface of holding member 16 and the optical converter 12a of the optical conversion element 12. In this case, there is only a fluctuation of gap A', a gap having a high accuracy can be formed. Moreover, fluctuations of other members are all absorbed by the gap B' and the gap A' is not influenced by such fluctuations and an extra external force is not applied to the optical converter 12a of optical conversion element 12 by the front end of holding member 16.

Figure 4:
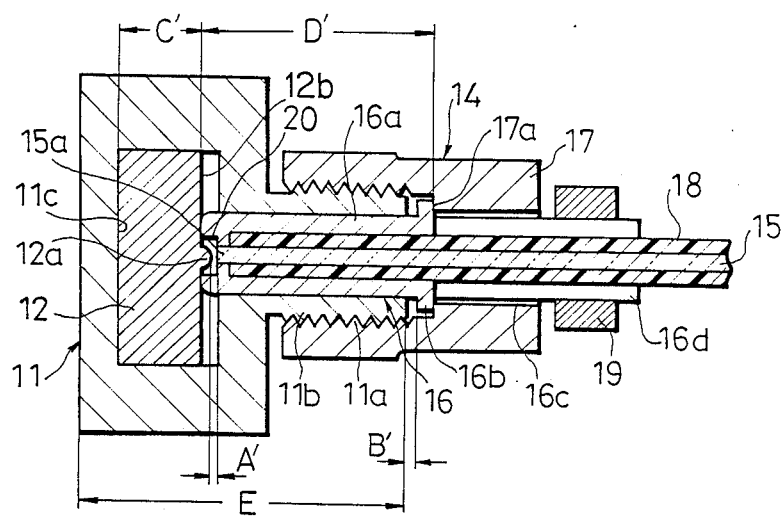
Figure 5:
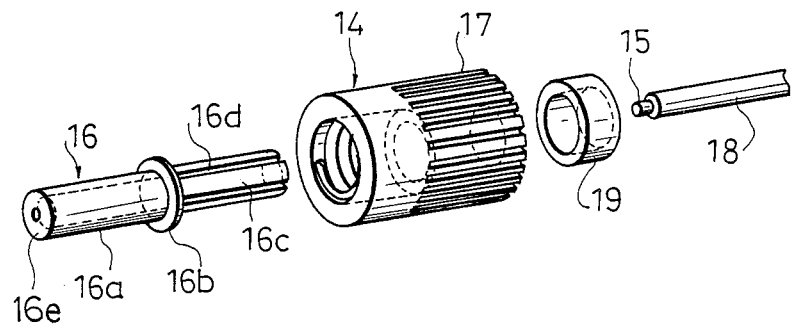
Figure 6:
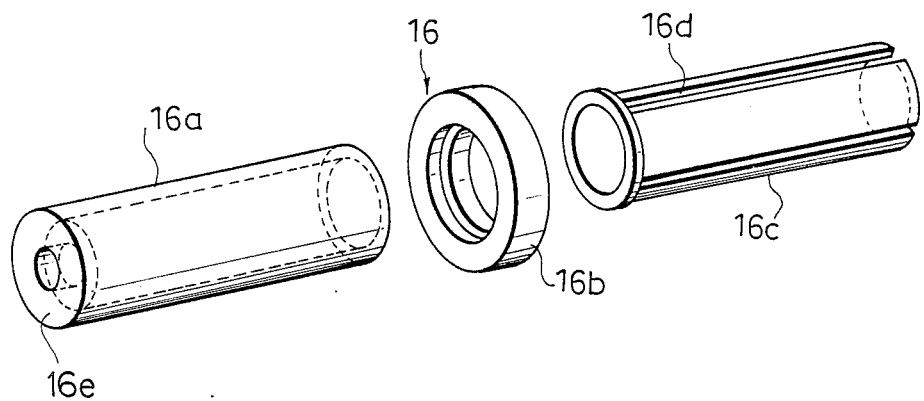

FIG. 4 illustrates another embodiment of the present invention. The same parts as those described above are given the same symbols and these are not expalined detail hereunder.

In FIG. 4, the end point of holding member 16 collides with the front surface 12b of optical conversion element 12 and a recessed part 20 is formed at the end point of holding member 16. An optical converter 15a is provided at the optical guide path end of optical fiber 15 located at the deepest area of this recessed part 20. The gap A' between the optical converter 15a and the optical converter 12a of optical conversion element 12 is formed to about 50 μm with a high accuracy. This gap A' is not influenced by fluctuations of other members and the gap A' has only the fluctuation of gap A' itself.

Of course the gap B' is set larger than a total sum of fluctuations in the lengths C', D', E and the length F from the engaging surface 12b of optical conversion element 12 to the front internal wall 11c of the light receptacle 11 (plug engaging member) and the gap B' absorbes such fluctuations.

Figure 7:
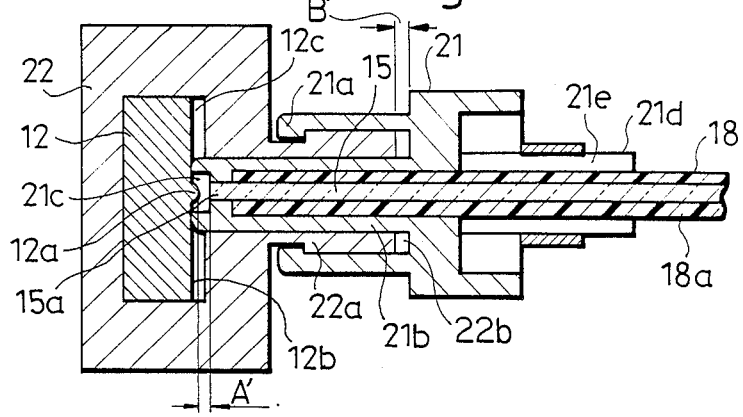
Figure 8:
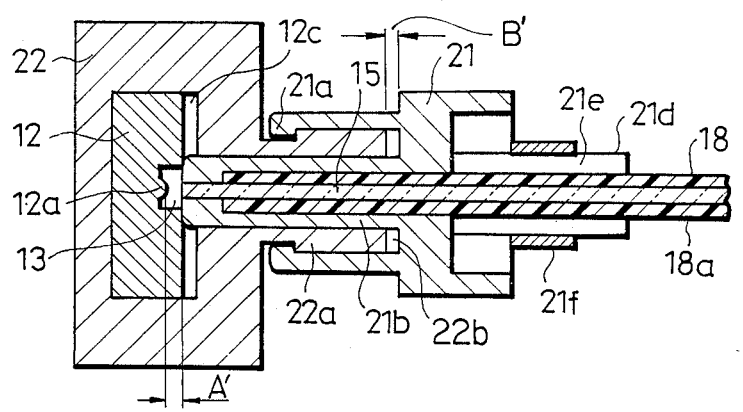
Figure 9:
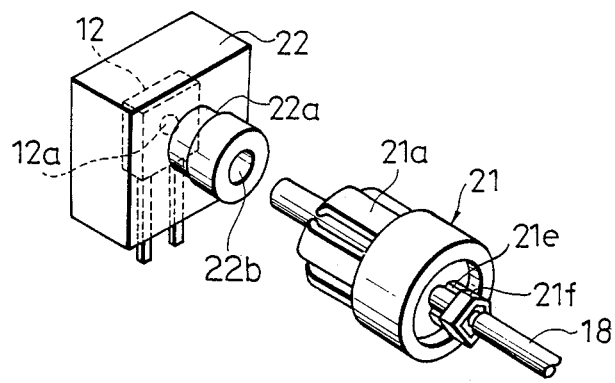
Figure 12:
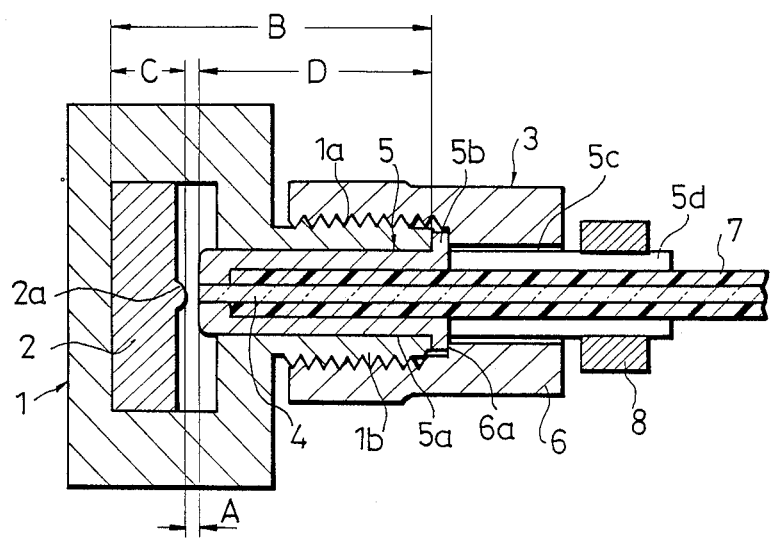
FIG. 12 is a sectional view illustrating a prior art.
Figure 13:
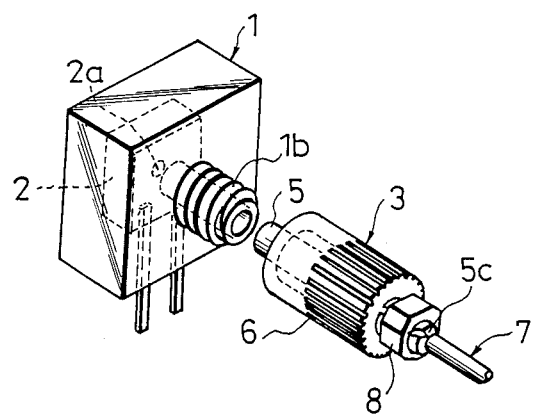
FIG. 13 is a perspective view illustrating separated condition of prior art.

FIG. 7 and FIG. 8 show an example of setting the plug with the snap-in system. The same parts as those in above embodiment are given the same symbols.

A split groove type engaging part 21a provided in front of the plug 21 is connected, by the snap-in system, to an engaging part 22a provided in front of the light receptacle 22 (plug engaging member).

The light receptacle has a cylindrical end surface 22b which is spaced from the plug 21 by the gap B' for absorbing tolerance fluctuations.

FIG. 7 illustrates an example where the optical converter 15a of optical guide path end of optical fiber 15 is provided to the recessed part 21c of the cylindrical part for holding 21b integrally formed with the plug 21, while FIG. 8 illustrates an example where the optical converter 12a of optical guide path end of optical conversion element 12 is provided to the recessed part 13 of optical conversion element 12. It is sure that various connecting systems other than the threading system and snap-in system can also be adopted to the plug connection system.

In FIG. 7 and FIG. 8, 21d represents a cylindrical part having a slit 21e provided at the rear part of plug 21 and 21f represents a fixing device.

Each embodiment described above is an example of connector for removably coupling optical converters at the optical guide path ends of optical conversion element and optical fiber. The present invention is not limited only to these embodiments. For example, the present invention can also be adopted to the connectors which removably couple the optical converters of optical guide path ends of optical fibers as shown in FIG. 10 and FIG. 11.

In the same figures, the same parts as those in above embodiments are given the same symbols. Numeral 23 represents an adapter (plug engaging member) having external thread 23a for engaging the optical converter 15a of optical fiber 15. The holding member 16 is inserted on each side along the right and left cylindrical parts 23b, 23b of the two-sided adapter 23, a recessed part 24 is formed to the one or both ends of end part of holding member 16. As shown in FIG. 11, when the end surfaces 16e, 16e of the optical fibers 15 are collided with each other, a constant gap A' is defined between the end surfaces of optical converters 15a, 15a of optical fibers 15, 15. As in the case of above example, fluctuations of other members are absorbed by providing the gap B'. The plug 14 can select as required the connecting means such as the snap-in system in addition to the thread system illustrated in the figure.

As described above, according to the invention, the engaging surfaces 12b, 16e, and 12c act as stopping surfaces such that a desired gap B' is left between the insertion end surfaces of the cylindrical parts 11b, 22b, and 23b and the plugs 14 and 21. Further, a gap A' acting as a clearance between the optical converters 12a and 15a is maintained by the dimensions of the recessed parts 13, 20, 21c, and 24. Control over the dimensions of the recessed parts and the engaging surfaces as well as a material quality thereof enable provision of an optical connector of high quality at less expensive cost. Further, the provision of the gap B' ensures that variations due to temperature or external stress will not have an adverse effect on the desired spacings of the optical elements.

What is claimed is:

1. An optical fiber connector comprising:

a holding member having a front part for holding an end of an optical fiber therein and a collar part, wherein a selected length is provided between a front end surface of said front part and said collar part;

a plug in which said holding member is disposed having an internal part which abuts against said collar part of said holding member to press it in an insertion direction, and an engaging part formed on a front end of said plug forwardly of said collar part; and a plug engaging member having a mounting portion in which an optical element is fixed in a recess of a predetermined depth from a front engaging surface of the mounting portion, a front portion for snugly receiving said front part of said holding member, wherein said front end surface of said holding member is abutted in contact with said front engaging surface of said mounting portion such that said optical fiber end is disposed facing the optical element in said plug engaging member by a predetermined distance, and an engaged part formed on said front portion which is removably engaged with said engaging part of said plug;

wherein said length of said holding member is selected such that when said holding member is inserted in said front portion of said plug engaging member to bring said front end surface of said front part of said holding member into abutting contact with said front engaging surface of said mounting portion, a small gap (B') is provided between said collar part and said front portion of said plug engaging member which allows sufficient space in case of differences in tolerances of said parts such that said front portion of said plug engaging member never abuts against said collar part, in order to ensure that said front end surface of said holding member can always be pressed against said front engaging surface of said mounting portion by a force of engagement of said engaging part of said plug with said engaged part of said plug engaging member, whereby the optical fiber end is maintained accurately spaced opposite the optical element by said predetermined distance.

2. An optical fiber connector comprising:

a holding member having a front part for holding an end of an optical fiber therein and a collar part, wherein a selected length is provided between a front end surface of said front part and said collar part, and said optical fiber end is fixed in said front part of said holding member recessed from said front end surface by a predetermined depth;

a plug in which said holding member is disposed having an internal part which abuts against said collar part of said holding member to press it in an insertion direction, and an engaging part formed on a front end of said plug forwardly of said collar part; and a plug engaging member having a mounting portion in which an optical element is fixed in a front engaging surface of the mounting portion, a front portion for snugly receiving said front part of said holding member, wherein said front end surface of said holding member is abutted in contact with said front engaging surface of said mounting portion such that said optical fiber end is disposed facing the optical element in said plug engaging member by a predetermined distance, and an engaged part formed on said front portion which is removably engaged with said engaging part of said plug;

wherein said length of said holding member is selected such that when said holding member is inserted in said front portion of said plug engaging member to bring said front end surface of said front part of said holding member into abutting contact with said front engaging surface of said mounting portion, a small gap (B′) is provided between said collar part and said front portion of said plug engaging member which allows sufficient space in case of differences in tolerances of said parts such that said front portion of said plug engaging member never abuts against said collar part, in order to ensure that said front end surface of said holding member can always be pressed against said front engaging surface of said mounting portion by a force of engagement of said engaging part of said plug with said engaged part of said plug engaging member, whereby the optical fiber end is maintained accurately spaced opposite the optical element by said predetermined distance.

3. An optical fiber connector as claimed in claim 2, for forming an optical connection between two optical fiber ends, further comprising a second holding member for holding a second optical fiber end recessed a predetermined depth from a second front end surface thereof, said second holding member being disposed in a second plug and having a front part and a collar part, and said second plug having an internal part, front end, and an engaging part, which parts are the same as those of the first-mentioned holding member and plug, wherein said plug engagaing member includes a rear portion for receiving the front part of said second holding member, the front end surface of said second holding member being disposed in abutting contact with the front end surface of the first holding member so that said two optical fiber ends are spaced apart by a predetermined distance, and a second engaged part formed on said rear portion which is removably engaged with the engaging part of said second plug.

* * * * *